INVENTORS
KARL H. DOERINGSFELD
RALPH T. OSEN
BY
ATTORNEY

Feb. 10, 1970   K. H. DOERINGSFELD ET AL   3,494,376
CONTROL APPARATUS
Filed Oct. 12, 1967   2 Sheets-Sheet 2

INVENTORS
KARL H. DOERINGSFELD
RALPH T. OSEN
BY
ATTORNEY

United States Patent Office 3,494,376
Patented Feb. 10, 1970

3,494,376
CONTROL APPARATUS
Karl H. Doeringsfeld, Edina, and Ralph T. Osen, Golden Valley, Minn., assignors to Honeywell Inc., Minneapolis, Minn., a corporation of Delaware
Filed Oct. 12, 1967, Ser. No. 674,913
Int. Cl. G05d *11/02;* F16k *31/36, 51/00*
U.S. Cl. 137—624.14                                    9 Claims

ABSTRACT OF THE DISCLOSURE

An oscillating valve for dissemination of liquid or gaseous fluid in a quantized periodic fashion. The device is comprised of a control cylinder subdivided into first and second chambers by a yieldable partition, each of the chambers having an inlet port connected to a source of pressure and each chamber having an outlet port. The outlet port of the second chamber is equipped with a flow restrictor member whose function it is to control the rate of fluid flow through the outlet to thereby control the frequency of oscillation of the valve assembly.

BRIEF SUMMARY OF THE INVENTION

The device is comprised of a control cylinder subdivided into first and second chambers by a yieldable partition. The partition may consist of a diaphragm or a slideable piston. Each of the two chambers has an inlet port and an outlet port. The inlet ports are connected respectively to first and second fluid pressure sources. The outlet port of the second chamber is further equipped with a flow restrictor member whose function it is to control the rate of flow through the outlet. Valves are provided at the outlet of the first chamber and the inlet of the second chamber. These valves are controllable through rods which are connected to the partition. Both of the valves are opened when the partition moves in the first direction, and both are closed when it moves in the opposite direction. By applying proper pressure at the two inlet ports, the partition member is made to oscillate back and forth and to periodically open and close the two valves. The frequency of oscillation is determined by the rate at which the fluid or gas is allowed to escape through the restrictor member at the outlet of the second chamber.

It is therefore an object of the present invention to provide a valve mechanism which opens and closes in response to fluid pressure. A more specific object of the present invention is to provide a fluid controlled device for disseminating a fluid in a quantized periodic fashion. These and further objects will become apparent to those skilled in the art upon examination of the following specification, claims, and drawings, of which:

DESCRIPTION OF THE PREFERRED EMBODIMENTS

Figure 1:
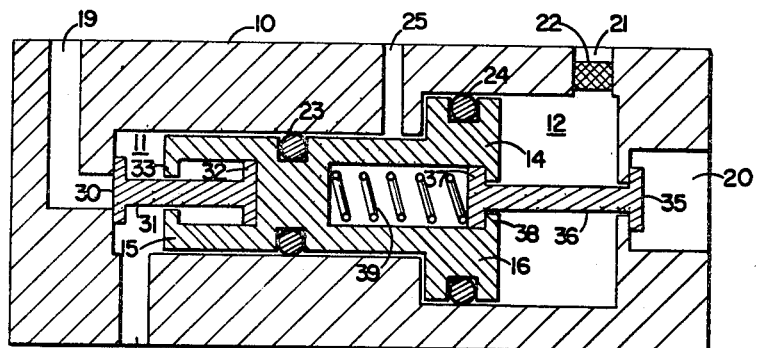
FIGURE 1 illustrates a preferred embodiment of the valve mechanism according to the present invention in a first stage of its operating cycle.

Referring to FIGURE 1, there is shown a valve mechanism including a control cylinder 10. Control cylinder 10 has an internal cavity of generally cylindrical shape oriented co-axially with control cylinder 10. The internal cavity is comprised of a first segment 11 of a relatively small diameter and a second segment 12 of a relatively larger diameter. A piston member 14 is located within the cavity for axial motion. Piston member 14 has a first segment 15 corresponding in diameter to the cross-section of cavity segment 11, and second segment 16 of a larger diameter corresponding to the cross-sectional dimension of cavity segment 12. Piston member 14 divides the internal cavity of control cylinder 10 into two separate chambers 11 and 12. Chamber 11 has an inlet 18 and an outlet 19. Chamber 12 has an inlet 20 and a outlet 21. A flow restrictor 22 is positioned within outlet 21 to control the rate of fluid flow through said outlet. Piston member 14 has an O-ring 23 around the periphery of its smaller diameter segment 15 and an O-ring 24 around the periphery of its larger diameter segment 16. The purpose of these O-rings is to prevent fluid flow between chambers 11 and 12. A vent 25 is located in the vicinity of junction between cavity segments 11 and 12, between O-rings 23 and 24.

Piston 14 has a first axial cylindrical bore in its segment 15 and a second axial cylindrical bore in its segment 16. The two cylindrical bores serve as valve stem guides for valve stems 31 and 36 of valves 30 and 35 respectively. Valve 30 is located at outlet 19 of chamber 11 and valve 35 is located at inlet 20 of chamber 12. The end of valve stem 31 of valve 30 located within the bore in piston 14 has a stop 32 which allows the valve to move axially for a distance corresponding to the length of the piston bore, but is prevented from further motion by a stop 33 located at the outer end of the bore.

Valve stem 36 of valve 35 at the opposite end of the valve assembly also has a stop 37, allowing the stem to move longitudinally within the cylindrical bore. A corresponding stop 38 is located at the external end of the bore to limit the longitudinal motion of stem 36. A spring member 39 is positioned within the bore behind stop 37, to bias stem 36 towards the external end of the axial bore. Valve stem 36 carries a valve member 35 for closing and opening inlet port 20 of chamber 12.

Figure 4:
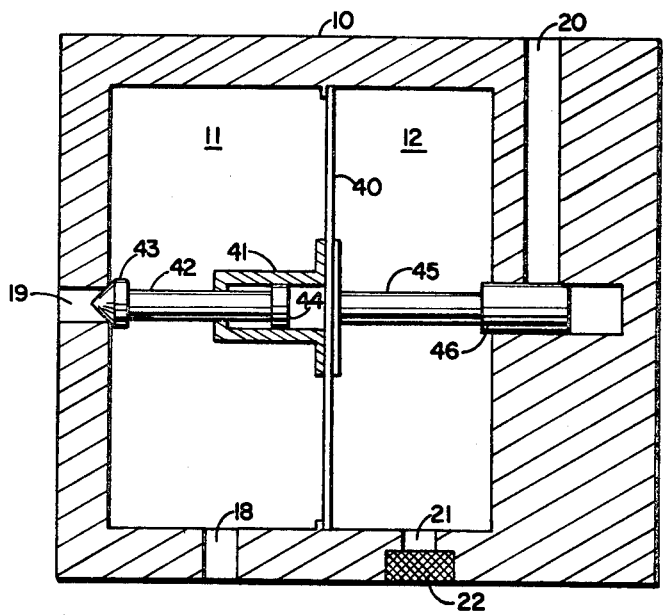
FIGURE 4 illustrates an alternate embodiment of the present invention.

An alternate embodiment of the present invention is illustrated in FIGURE 4. As in the apparatus of FIGURE 1, control cylinder 10 is subdivided into two chambers 11 and 12. The dividing member in this case, however, is a diaphragm 40 rather than piston 14. Chamber 11 has an inlet port 18 and an outlet port 19 and chamber 12 has an inlet port 20 and an outlet port 21. Outlet port 21 is further equipped with a flow restrictor member 22 whose function it is to control the rate of fluid flow from chamber 12.

Diaphragm 40 has mounted centrally on the side facing chamber 11 a valve stem guide bracket 41. Guide bracket 41 has a central bore within which is mounted a valve stem 42 of a valve 43. The internal end of valve stem 42 is equipped with a stop 44. Stop 44 limits the longitudinal motion of valve stem 42. A valve stem 45 of a valve 46 is connected directly to diaphragm 40 on the side facing chamber 12. Valve 46, through stem 45 and the operation of diaphragm 40, regulates the flow of fluid into chamber 12 through inlet port 20. In both embodiments of FIGURE 1 and FIGURE 4, the inlet ports of the two chambers are connected to high pressure sources. A single pressure source may be used to provide the pressure to both chambers. Preferably, however, separate sources will be provided since the fluid entering chamber 11 is in itself, or contains as a part thereof, an agent for controlled distribution to outlet 19.

OPERATION

Figure 2:
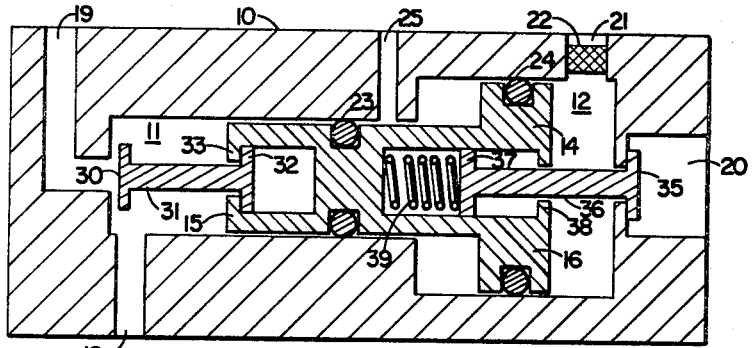
FIGURE 2 illustrates the valve mechanism of FIGURE 1 in a second stage of its operating cycle.

The pressure applied through inlet port 18 will cause piston member 14 to move in a direction to expand chamber 11 and to contact chamber 12. Any fluid which may be present in chamber 12 will be forced out through outlet port 21 and restrictor member 22. Since restrictor member 22 controls the rate of fluid outflow from chamber 12, the rate at which piston 14 will be moving will be determined. As piston 14 continues its motion towards chamber 12 after a predetermined distance, stop 32 on valve stem 31 is engaged by stop 33 on piston 14, causing valve 30 to be pulled away from outlet port 19. This is illustrated in FIGURE 2. As outlet port 19 is opened, the fluid from chamber 11 is allowed to escape through outlet 19.

Figure 3:
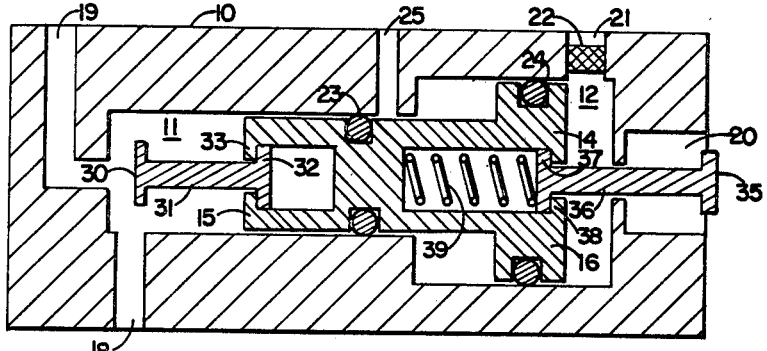
FIGURE 3 illustrates the valve mechanism of FIGURE 1 in a third stage of its operating cycle.

Continued pressure supplied at inlet 18 continues the motion of piston 14 until valve 35 is opened, as shown in FIGURE 3, by the force applied through valve stem 36. Until such time valve 35 is maintained in its closed condition by the pressure applied at inlet 20. As piston 14 is moved towards chamber 12, valve 35 is not immediately opened. Rather, spring 39 is compressed until its force exceeds the pressure supplied at inlet 20, at which time valve 35 snaps open to allow fluid flow through inlet 20 into chamber 12. The sudden increase in fluid pressure within chamber 12 will move piston 14 back towards chamber 11, closing outlet port 19 of chamber 11 and inlet port 20 of chamber 12. One cycle of the valve operation is thus completed. It will be periodically repeated as long as pressure is maintained at inlet ports 18 and 20.

The pressure applied at inlet port 20 of chamber 12 must be sufficiently large in relation to the pressure applied at inlet port 18 of chamber 11 to exert a force on piston 14 within chamber 12 which will exceed the opposing force caused by pressure within chamber 11. Since the surface area of the piston in chamber 12 is greater than the surface area within chamber 11, the pressure at inlet 20 which is equal to the pressure at inlet 18 will be sufficient. If, however, the cross-sectional areas of the two ends of the piston are the same, the pressure within chamber 12 must exceed pressure within chamber 11 to accomplish the desired movement of the piston member.

The operation of the apparatus in FIGURE 4 is very similar to that of the apparatus of FIGURE 1. The pressure applied at inlet 18 of chamber 11 causes diaphragm 40 to flex toward chamber 12. As diaphragm 40 is deflected toward chamber 12, valve stem guide bracket 41 is carried with the diaphragm until it engages stop 44 of valve stem 42. Upon further movement of diaphragm 40 towards chamber 12, valve 43 is pulled away from outlet port 19 to allow fluid flow therethrough. At the same time, valve stem 45 within chamber 12 is pushed in the same direction. Piston 46 carried by valve stem 45 will be moved through a distance until inlet port 20 is opened to permit high pressure fluid to enter through inlet port 20 and force diaphragm 40 back towards chamber 11, whereupon inlet port 20 of chamber 12 and outlet port 19 of chamber 11 are closed. This cycle is repeated, causing the valve system to oscillate in a periodic fashion.

What is claimed is:
1. Apparatus of the class described comprising:
a control cylinder;
a yieldable partition mounted within said cylinder, subdividing said cylinder into first and second chambers, each of said chambers being equipped with an inlet port for connection to a fluid pressure source and each further being equipped with an outlet port for removing the fluid from the respective chambers;
means positioned at the outlet port of said second chamber for controlling the rate of fluid flow from said second chamber;
a first valve being provided at the outlet port of said first chamber and a second valve being provided at the inlet port of said second chamber;
first and second valve stems connected to said first and second valves respectively;
means on said partition for engaging said first valve stem and opening said first valve upon displacement of said partition in the direction of said second chamber by a first predetermined amount; and
means on said partition for engaging said second valve stem and opening said second valve upon further displacement of said partition in the direction of said second chamber.

2. Apparatus according to claim 1 wherein said yieldable partition is a piston.

3. Apparatus according to claim 2 wherein said means for controlling the rate of fluid flow at the outlet port of said second chamber is a porous restrictor member.

4. Apparatus according to claim 1 wherein said yieldable partition is a flexible diaphragm.

5. An oscillating fluid control device comprising:
a control cylinder;
a yieldable partition mounted within said cylinder, subdividing it into first and second chambers;
a first inlet port communicating with said first chamber for connection to a first fluid pressure source;
a second inlet port communicating with said second chamber for connection to a second fluid pressure source;
first and second outlet ports in said first and second chambers respectively;
a porous restrictor member mounted in said second outlet port for restricting and controlling the rate of fluid flow through said second outlet; and
first and second valves for closing and opening said first outlet port and said second inlet port respectively, said valves being controlled through valve stems connected to said yieldable partition such that said first valve is opened when said partition is displaced in the direction of said second chamber by a first amount, said second valve is opened when said partition is displaced further in the direction of said second chamber, and said two valves are closed when said partition is forced toward said first chamber by increased pressure derived through the open valve at said second inlet port from said second fluid source.

6. Apparatus according to claim 5 wherein said yieldable partition is a piston.

7. Apparatus according to claim 5 wherein said yieldable partition is a flexible diaphragm.

8. An oscillating fluid control device comprising:
a control cylinder;
a yieldable partition mounted within said cylinder, subdividing it into first and second chambers;
a first inlet port communicating with said first chamber for connection to a first fluid pressure source;
a second inlet port communicating with said second chamber for connection to a second fluid pressure source;
first and second outlet ports in said first and second chambers respectively;
a porous restrictor member mounted in said second outlet port for restricting and controlling the rate of fluid flow through said second outlet; and control means for opening said first outlet port when said yieldable partition is displaced in the direction of said second chamber by a first amount and for opening said second inlet port when said yieldable partition is displaced further in the direction of the second chamber, said control means being operable to close said first outlet port and said second inlet port when said partition is forced toward said first chamber by fluid pressure exerted through said second inlet port from said second fluid source.

9. The oscillating fluid control device of claim 8 wherein said control means includes valves controlled through valve stems connected to said yieldable partition.

References Cited
UNITED STATES PATENTS

| | | | |
|---|---|---|---|
| 2,985,193 | 5/1961 | Clack | 137—624.11 X |
| 3,340,896 | 9/1967 | Mon et al. | 137—624.13 X |

WILLIAM F. O'DEA, Primary Examiner

DAVID J. ZOBKIW, Assistant Examiner

U.S. Cl. X.R.

137—87, 630.19; 251—48